Dec. 8, 1942.	L. C. STRINGER	2,304,714
METHOD AND APPARATUS FOR USE IN RECONDITIONING GAS FILLED LAMPS
Filed June 20, 1941	6 Sheets-Sheet 1
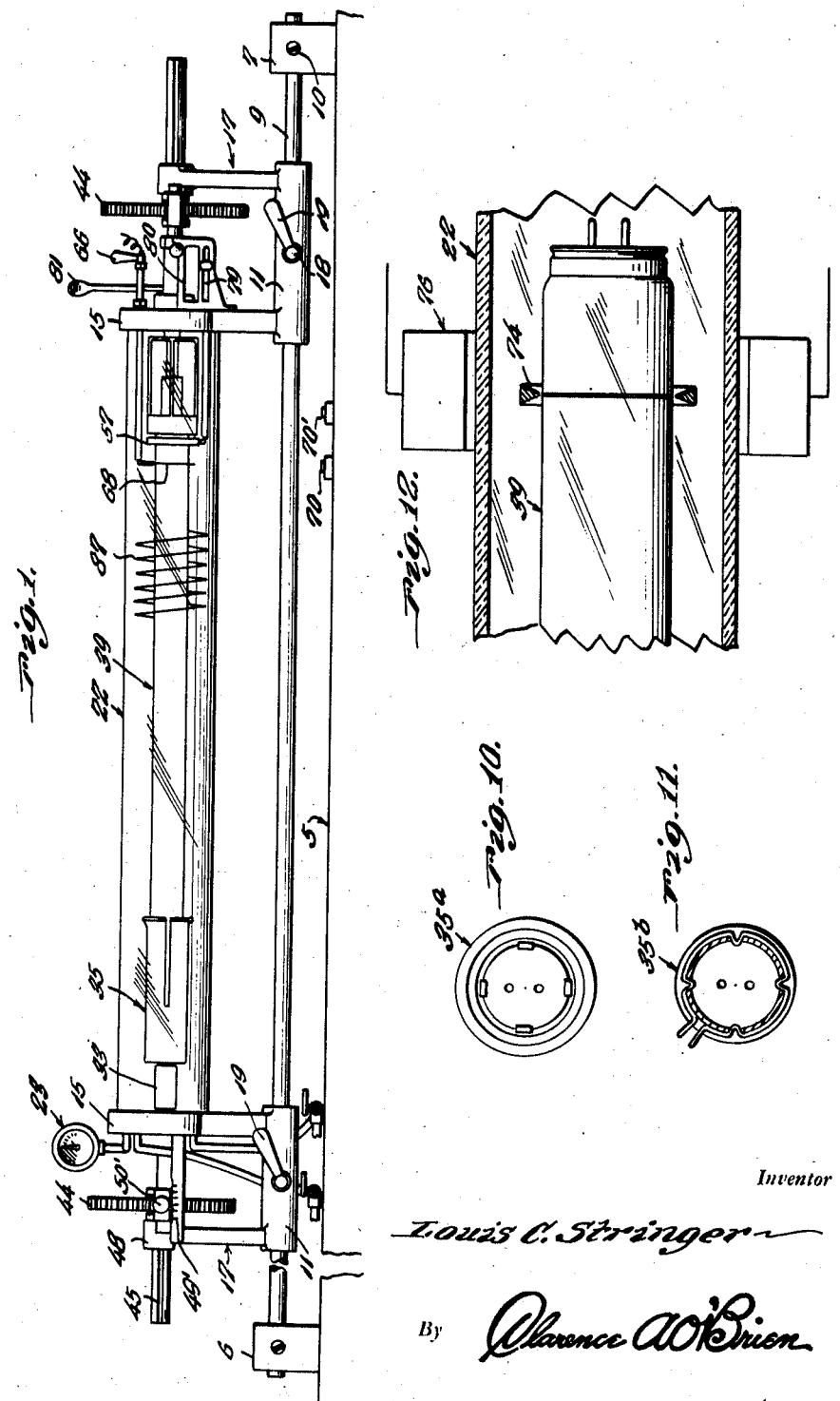
Inventor
Louis C. Stringer
By Clarence A. O'Brien
Attorney

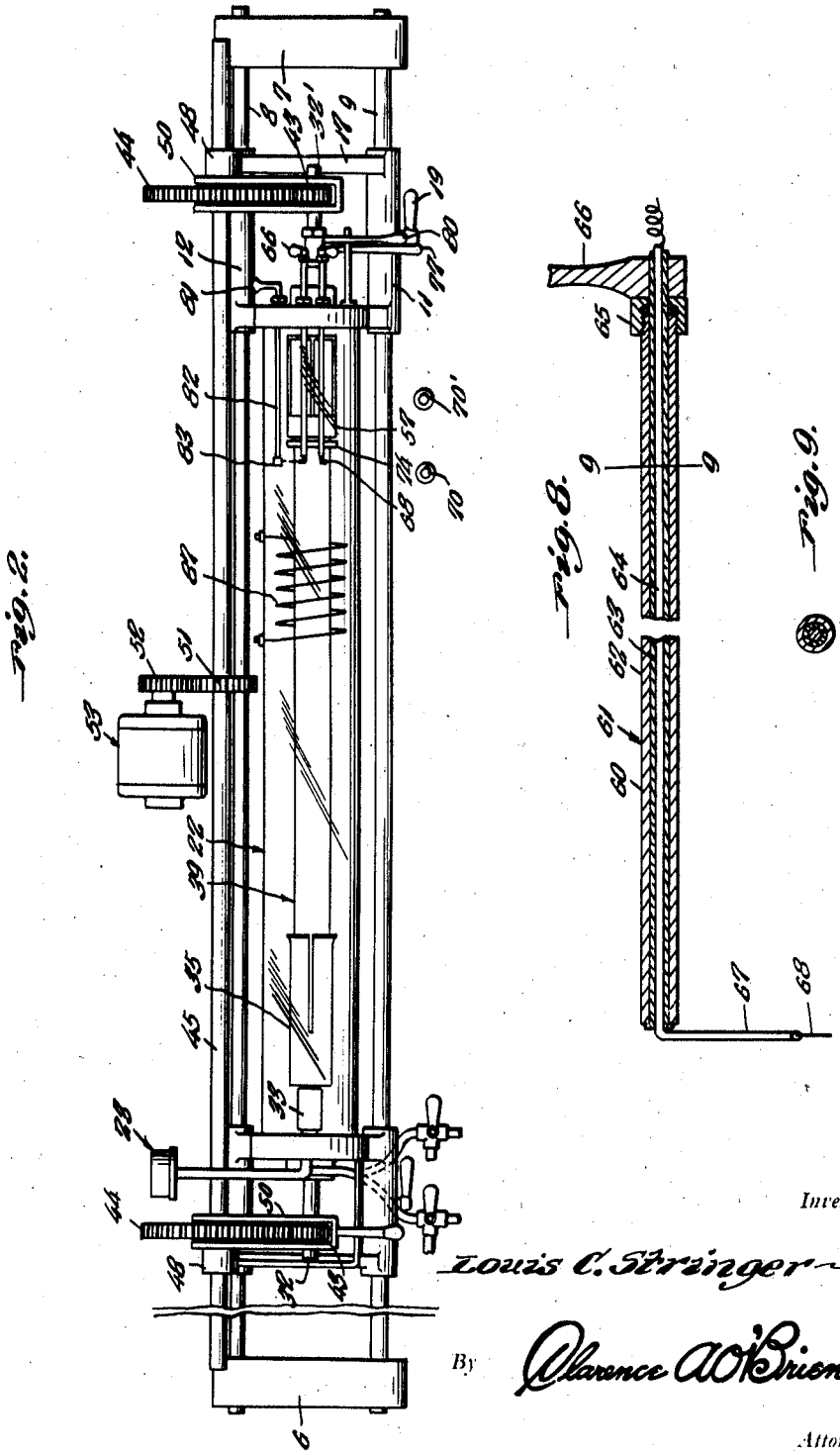
Dec. 8, 1942.   L. C. STRINGER   2,304,714
METHOD AND APPARATUS FOR USE IN RECONDITIONING GAS FILLED LAMPS
Filed June 20, 1941   6 Sheets-Sheet 2
Inventor
Louis C. Stringer
By Clarence A. O'Brien
Attorney

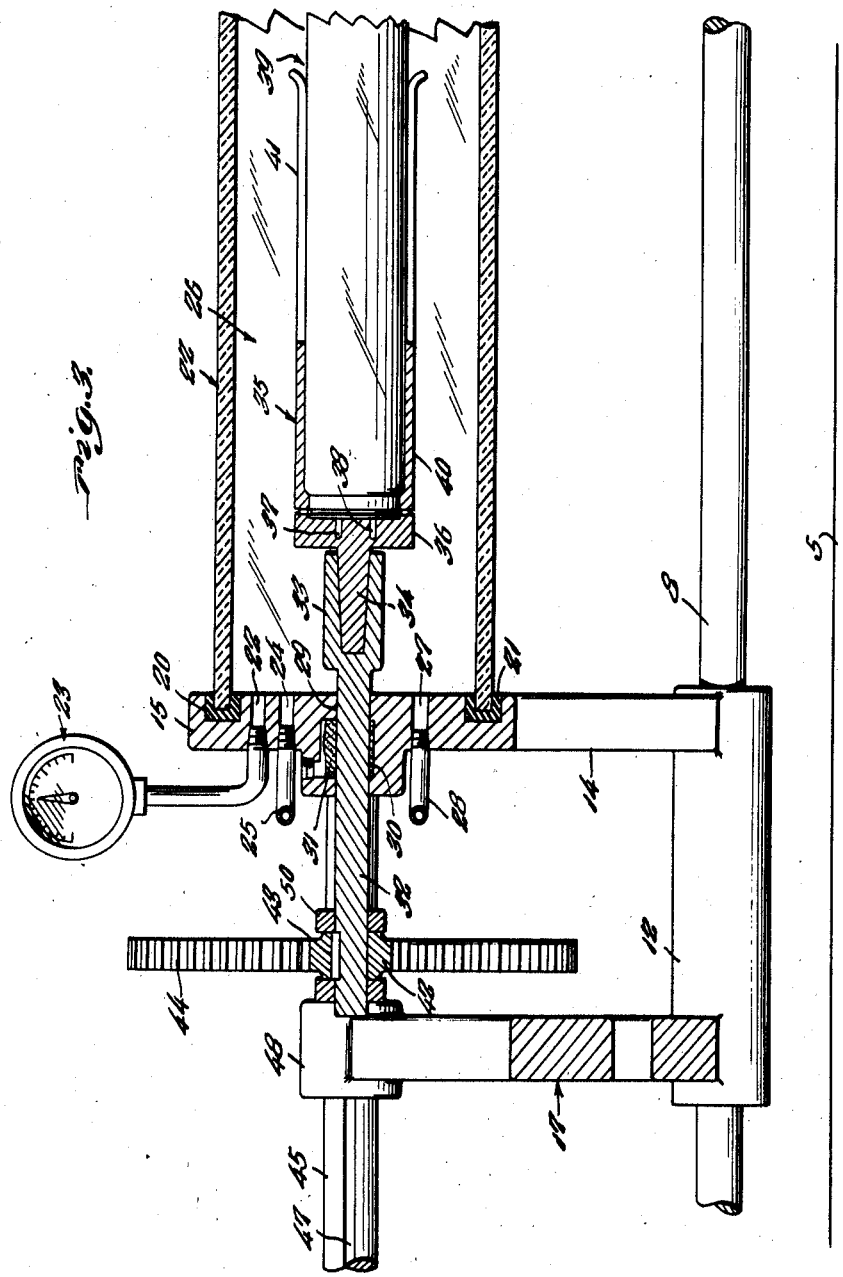

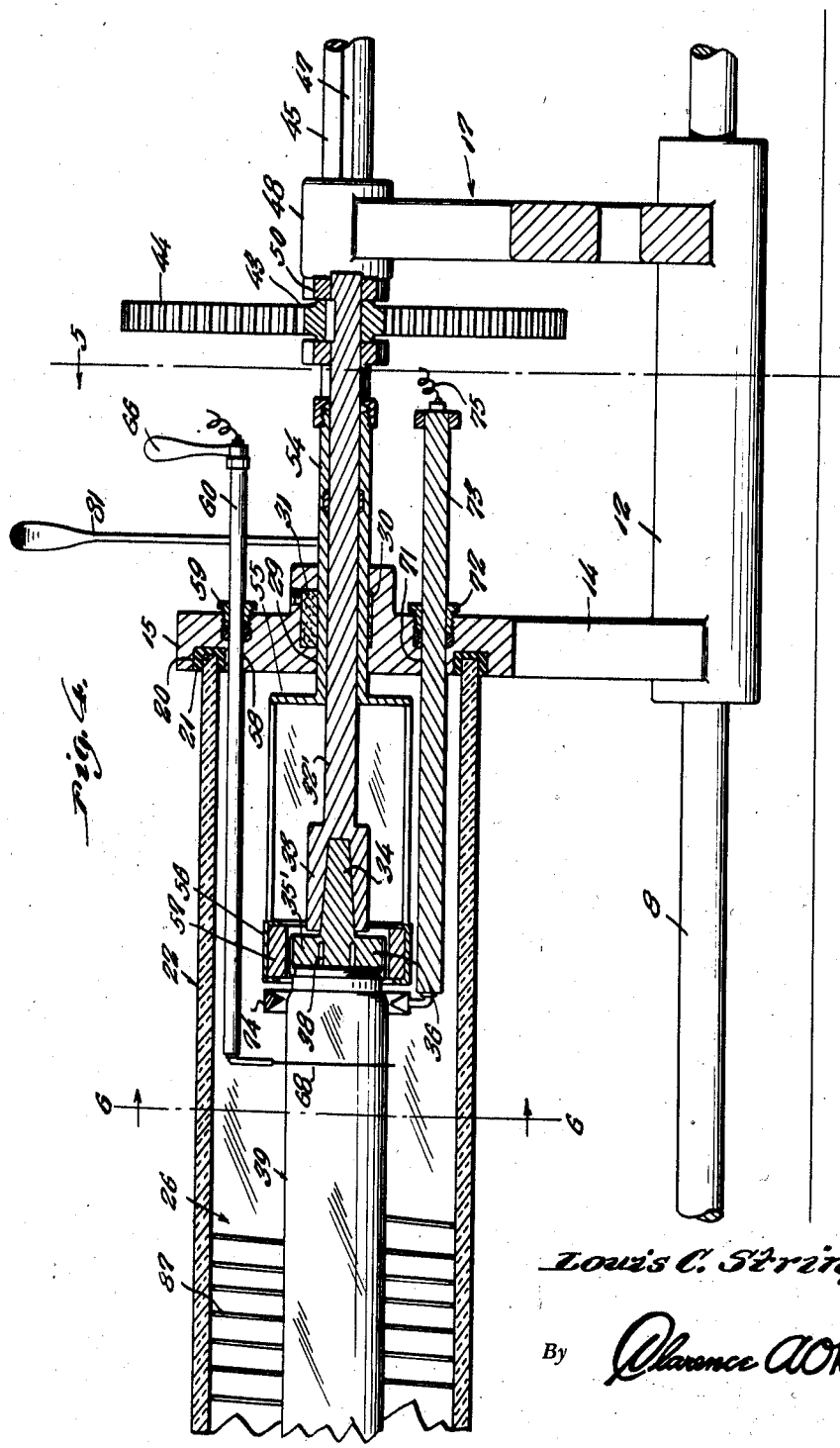

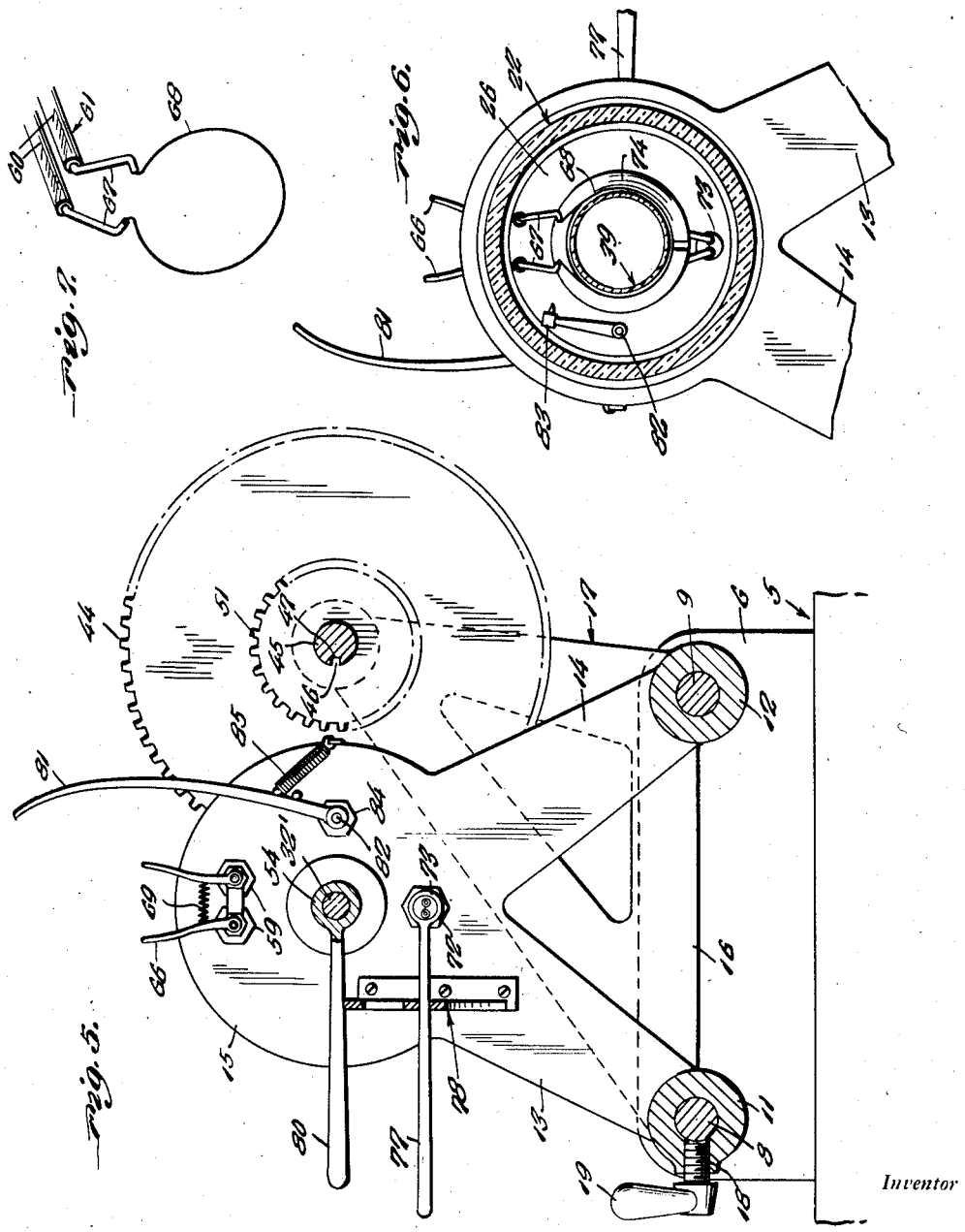

Dec. 8, 1942. L. C. STRINGER 2,304,714
METHOD AND APPARATUS FOR USE IN RECONDITIONING GAS FILLED LAMPS
Filed June 20, 1941 6 Sheets-Sheet 6
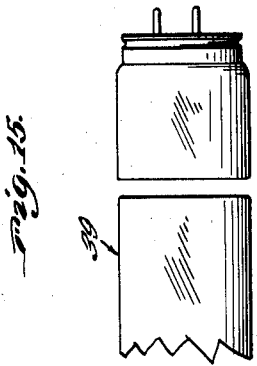
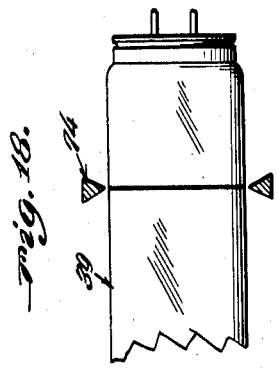
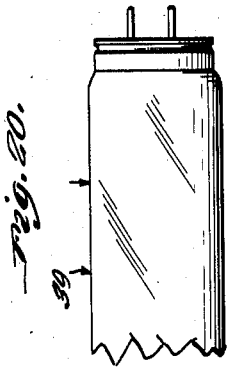
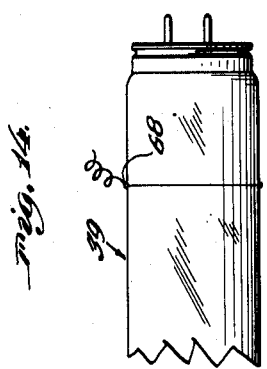
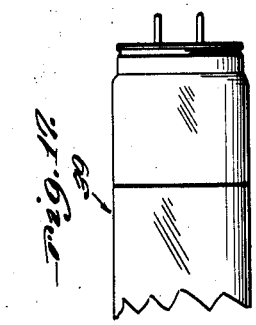
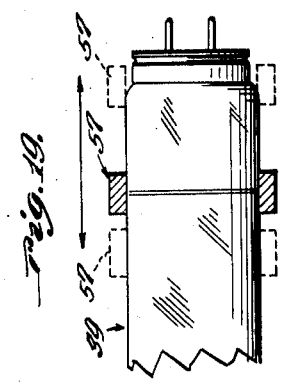
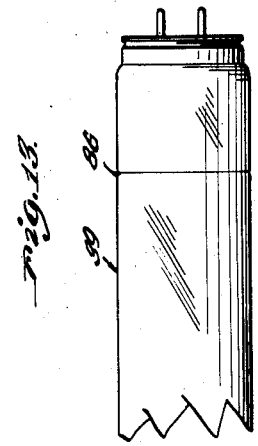
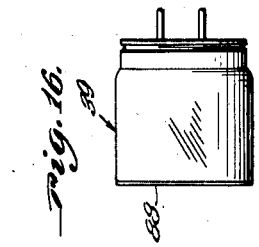
Inventor
Louis C. Stringer
By Clarence A. O'Brien
Attorney Patented Dec. 8, 1942

2,304,714

UNITED STATES PATENT OFFICE 2,304,714

METHOD AND APPARATUS FOR USE IN RECONDITIONING GAS FILLED LAMPS

Louis C. Stringer, Newark, N. J.

Application June 20, 1941, Serial No. 399,002

17 Claims. (Cl. 176—3)

My invention relates to improvements in means for facilitating and rendering practical the reconditioning of gas filled lamps and the like, and particularly to method and means enabling and facilitating reconditioning of such lamps on a commercial scale, and the primary object of my invention is to provide means of the character indicated whereby the severance of sections of the tube or bulb of the lamp is quickly and easily accomplished, together with conservation of the gas within the tube or bulb, and permanent assembly of the severed sections is accomplished in a manner to leave a minimum of evidence of the operation.

Other important objects and advantages of my invention will be apparent from a reading of the following description taken in connection with the appended drawings, wherein for purposes of illustration I have shown preferred embodiments of my invention.

In the drawings—

Figure 1 is a general side elevational view of the apparatus showing a gas filled tubular type of lamp in position therein.

Figure 2 is a top plan view of Figure 1.

Figure 3 is an enlarged fragmentary longitudinal vertical sectional view taken through the left hand end portion of Figure 2.

Figure 4 is a similar fragmentary longitudinal vertical sectional view taken through the right hand end portion of Figure 2.

Figure 5 is an enlarged transverse vertical sectional view taken along the line 5—5 of Figure 4 and looking in the direction of the arrow.

Figure 6 is a transverse vertical sectional view taken through Figure 4 along the line 6—6 and looking toward the right in the direction of the arrow.

Figure 7 is a fragmentary perspective view of the severing implement.

Figure 8 is a fragmentary enlarged longitudinal vertical sectional view taken through the severing implement.

Figure 9 is a transverse vertical sectional view taken through Figure 8 along the line 9—9 and looking in the direction of the arrow.

Figure 10 is an end elevational view of one of the lamp sockets.

Figure 11 is a transverse vertical sectional view taken through the other socket.

Figure 12 is an enlarged longitudinal vertical fragmentary sectional view taken through the chamber of an arrangement of the invention in which an electronic bombarding device is utilized to heat the melting ring.

Figure 13 is a fragmentary side elevational view illustrating a lamp bulb prepared for severance into sections by a peripheral score.

Figure 14 is a view similar to Figure 13 showing the heating implement applied to the score.

Figure 15 is a view similar to Figure 14 but showing the severance of the sections.

Figure 16 is a side elevational view of one of the severed sections, showing a film of molten glass applied to the severed end thereof in the event that the severed end is uneven.

Figure 17 is a side elevational view showing the severed sections brought together for reuniting.

Figure 18 is a view similar to Figure 17 but showing the melting ring in place for melting and welding the meeting edges of the severed sections.

Figure 19 is a view similar to Figure 18 with the melting ring removed and the smoothing ring in place and illustrating different positions in which the ring may be adjusted or reciprocated according to requirements.

Figure 20 is a side elevational view of the reunited sections with an arrow indicating the point of reunion and illustrating the absence of evidence of the severance and reunion of the sections of the bulb or tube.

Referring in detail to the drawings, and in particular Figures 1 through 11, the numeral 5 generally designates a horizontal supporting surface on which longitudinally spaced transversely elongated blocks 6 and 7 are securely mounted to support transversely spaced horizontal slide bars 8 and 9, respectively, in apertures formed in the blocks, with the longitudinal adjustment secured by means of set screws 10 penetrating the sides of the blocks.

A pair of substantially similar slide carriages are longitudinally slidably mounted on the bars or rods 8 and 9, each such carriage comprising a pair of lower tubes 11 and 12 slidably along the rods 8 and 9 and spaced and connected at their axially inward ends by upwardly converging legs 13 and 14 whose upper ends merge, as indicated in Figure 5, into a substantially circular head 15. The longitudinally outward end portions of the tubes 11 and 12 are spaced and connected by the base portion 16 of an obtuse angle triangle 17 whose vertex is laterally displaced with respect to the common axis of the heads 15, as clearly indicated in Figure 5 of the drawings. The tubes 11 are provided with locking screws 18 which penetrate the sides thereof and are manipulated by handles 19 for locking the carriages in adjusted positions along the rods 8 and 9.

Referring specifically to the left hand carriage, it is seen that the longitudinally inward face of the head 15 is formed with a concentric groove 20 in which is seated a channel-shaped gasket 21 arranged to receive and seal the adjacent end of the transparent glass tube 22 which in this case is plain cylindrical in form, but may assume any shape to accommodate lamps of different contours. A horizontal bore 22′ formed in the head has connection with the conduit of a gauge 23 of the type operating to show the amount of either pressure or vacuum existing within the chamber formed by the globe 22. A second bore 24 below the bore 22 traverses the head 15 and connects with the conduit 25 leading to a pressure pump for introducing the lamp gas under pressure into the interior of the tube 22 which is generally designated 26 as the chamber of the device. A third bore 27 below the other bores is connected to a conduit 28 leading to a vacuum device for withdrawing gas from the interior of the chamber 26. Neither the pressure device nor the vacuum producing device are shown as these may be of several different suitable types.

The central portion of the head 15 is formed with an axial bore 29 which opens into a mercury bearing chamber 30 in which is a suitably arranged body of mercury 31 to provide the desired gas-proof seal between the rotary mandrel shaft 32 and the head 15 to prevent passage of gas between these components during the operations of the device. The longitudinally inward end of the mandrel shaft 32 is provided with a chuck 33 to receive the spindle of the gas filled bulb or tube mounting socket 35 which includes the body portion 36 formed with depressions 37 to receive the prongs 38 on the adjacent terminal end of the lamp bulb or tube 39 as shown in Figure 3 of the drawings. The imperforate side walls 40 of the socket 35 adjacent the portion 36 snugly receive the bulb 39 while the split tensioned portion 41 sufficiently strongly grips the sides of the bulb to prevent relative rotation of the bulb and socket during the operations of the device.

The longitudinally outward end of the mandrel shaft 32 has a relatively small pinion 42 keyed thereto as indicated by the numeral 43, this pinion being in mesh with a relatively large gear wheel 44 which is longitudinally slidably mounted on the common drive shaft 45 and is provided with an internal key engaging in the slot 47 formed in the shaft 45, so that the gear wheel 44 maintains its drive connection with the shaft 45 despite changes in the distance between the carriages. Changing the spacing of the carriages is dictated by the lengths of the lamp bulbs or tubes being operated upon. The shaft 45 is journaled as indicated by the numeral 48 in the apex portions of the triangular members 17 of both carriages.

Horizontally disposed U-shapes 50 are journaled on the mandrel shafts of the respective carriages with their legs on opposite sides of the gears 44 whereby the said gears 44 are carried along the shaft 45 to be in constant alignment and mesh with the pinions 42. The common drive shaft 45 has fixed at an intermediate part thereof a drive pinion 41 which is in mesh with the pinion 52 on the shaft of a suitable motor 53.

Referring specifically to Figure 4 of the drawings showing the right hand head more in detail, the head 15 is provided with a groove 20 seating the channel gasket 21 sealingly receiving the adjacent end of the tube 22 forming the chamber 26. The axial bore 29 leads into a mercury bearing chamber 30 having the mercury content 31, but the mandrel 32′ of this head does not turn directly in the bore 29 but inside of a longitudinally slidable tube 54 which is circumposed thereon and terminates at its inner end in a web or spider 55 from which substantially parallel fingers project longitudinally inwardly to support an annulus 56 which encloses and supports a graphite smoothing ring 57 adapted to slide over the exterior of the lamp globe or tube 39 for a purpose to be indicated presently. However, the shaft 32′ has a chuck 33 like the other carriage for receiving the portion 34 of the socket 35′ in a non-rotatable manner.

The socket 35′ is unlike the socket 35 of the other carriage but instead has only the disk-like head 36 in which the depressions are provided for receiving the prongs 38 on the tube 39, the tube receiving portions 40 and 41 of the left hand head being absent from the socket 35′. Incidentally, in the event of handling a lamp having a bulb, such as a pear-shaped globe, the receiving elements 40 and 41 would be correspondingly shaped, it being deemed unnecessary to illustrate such an uninventive variation in view of its obvious availability, other than as indicated in Figures 10 and 11, showing in the first case spring fingers for embracing the globe, and in the second instance, an encircling clamping ring.

Formed in the upper part of the head 15 and in alignment with the axis of the mandrel shaft 32′ are bores 58 and glands 59 through which slidably pass each of a pair of horizontal rods 60 composing the severing implement which is generally designated 61. Each rod 60 comprises an outer metal tube 62, an inner glass tube 63 and an electrical conductor 64 within the glass tube 63, with a cap type coupling 65 on one end and operatively connected to the lever 66. At the opposite end of the rod 60 the insulated electrical conductor 64 has the depending laterally projecting arm 67 which terminates in one end of a broken ring 68 which when in relaxed position is larger in diameter than the globe or tube 39 of the lamp to be reconditioned. The wire 68 is of electrical resistance material capable of glowing with sufficient heat to quickly melt the glass of the tube 39 in a manner to be described. The arms 67 of the severing device are contracted toward each other by manipulating the levers 66, a spring 69 operating between the levers 66 to normally spread the levers and expand the ring 68 away from the sides of the lamp tube. A suitable current source (not shown) is provided for energizing the severing ring 68 and a suitable push button or other adequate switch 70 is provided on the support 5 for convenient operation by the operator for energizing the severing ring 68.

Below the center of the head 15 is a bore 71 sealed by a gland 72 through which is slidably arranged the supporting rod 73 on whose inner end is vertically positioned the tungsten melting ring 74 which is larger in diameter than the tube or bulb 39 at the point at which the severance and repair is to take place, the melting ring 74 being of triangular cross section as indicated in Figure 6 to apply a fine edge in the immediate neighborhood of the globe or tube 39. Suitable conductors 75 may lead through the rod 73 to heat and energize the tungsten melting ring 74, or as shown in Figure 12 of the drawings direct electrical energization of the melting ring 74 may be dispensed with and proper energization thereof accomplished by means of a bombarding device 76, illustrated in Figure 12, which may suitably comprise a ring 76 surrounding the chamber forming tube 22. It is to be observed that the melting ring 74 is located axially outwardly with respect to the severing ring 68 in order that these rings may not interfere with each other when moved back and forth into and out of operative position.

Means for operating the rod 73 to adjustably position the melting ring 74 comprises a horizontal lever 77 suitably connected to the rod 73 and projecting laterally through a horizontal slot 79 formed in the bracket 78 attached to the outer side of the head as shown in Figure 5 of the drawings. Another lever 80 works through another opening in the bracket 78 above the lever 77 and is suitably connected to the mandrel mounted outer tube 54 which carries and operates the smoothing ring 57. A swingable lever 81 is attached to a shaft passing through a gland 84 suitably sealing an accommodating bore in the head 15 to the right of the center of the head as shown in Figure 5, the shaft 82 having a laterally projecting glass cutter 83 adapted to be engaged with the side of the tube or lamp tube 39 while the same is rotated, to form a score in the periphery of the lamp bulb or tube for purposes to be indicated below. A retracting spring 85 is stretched between the remote part of the head 15 and the lever 81 to normally position the glass cutter in an out of the way arrangement.

The above described apparatus may be multiplied in any suitable arrangement or series, suitable to mass operation of the process. With respect to each bulb or tube to be operated upon as a condition precedent to the restoration, replacement, or repair of the electrodes therein, the process is performed substantially as follows.

The lamp tube 39 being installed by proper adjustment of the components of the above described device, the lever 18 is operated to bring the glass cutter 83 into contact with the side of the tube adjacent the end to be severed and the motor 53 is then started by operation of the hand switch 75 to rotate the lamp bulb or tube 39 and produce the score 86 in the exterior of the tube, the tube having been preheated to full expansion by a suitable heating means within the chamber 26 such as a helical heating element 87, suitably energized, and located in the tube 22 to surround the portion of the bulb or tube 39 to be scored and severed into sections.

The severing implement 61 is then worked by its levers 66 to put the ring 60 in registry with the score 86, and the levers 66 are then brought together to contract the ring 68 in place in the score, and electric current is then passed through the ring to heat it, whereby the tube 39 is melted along the score so as to separate the same into sections as illustrated in Figure 15 of the drawings. In the event one or both of the resulting sections present uneven or broken edges the edges may be dipped in molten glass to provide a film 88 rendering the edges even so that when they are brought together they will exactly match. However, only in the event of broken or uneven edges is this particular operation desirable.

With the sections separated as indicated in Figure 15, the interior of the sections may be serviced by any of the operations now practiced for reconditioning the electrodes, after which the sections are reassembled in the above described machine in the relation shown in Figure 75 17 of the drawings and the melting ring brought into registry with the juncture and energized by either of the two means described above so as to produce melting of the abutted edges of the sections, accompanied by a sufficient longitudinal pressure in opposite directions upon the sections to effect a glass weld.

Should the weld in process of formation exhibit a tendency of swelling or unevenness the smoothing ring 57 is reciprocated as indicated in Figure 19 of the drawings to "iron" the junction smooth and result in a practically invisible junction as shown in Figure 20.

But between the steps of severance illustrated in Figure 15 of the drawings and that of joining of the sections illustrated in Figures 18 and 19, the following steps take place:

Preceding the above described operations the chamber 26 is evacuated and some of the same gas that was contained originally within the lamp tube is introduced into the said chamber at substantially atmospheric pressure and the scoring operation is then performed. The severing ring is then applied and energized and when it has melted through the score a slight separating movement pulls the sections apart and allows them to be serviced and finally put back in place in the machine.

The chamber 26 is then exhausted and then some of the gas to be replaced in the reconditioned lamp is introduced into the chamber at the standard pressure for the particular lamp, just as the sections are brought together and the melting ring is heated to fuse the edges and cause their union by slight pressure of the sections toward each other.

Thus while the sections are being brought together the smoothing ring 57 is put in place over the junction to prevent swelling and damage to the sections of the tube and to insure a smoother uniform joint by preventing expansion of the abutted portions of the sections.

Should collapsing of the tube sections due to softening under the heat take place, the same can be rotated with the smoothing ring in place to bring out the walls of the sections to normal contour.

When the sections have been joined in the manner indicated the chamber 26 is exhausted with the smoothing ring 57 in place to prevent swelling of the joint sections which are still soft, and the exhausting is continued for a short space of time, at the end of which the joint is cold and sufficiently rigid to enable removal of the reconditioned lamp which is now ready for testing and operation in service.

Although I have shown and described herein preferred embodiments of the method and apparatus of my invention, it is to be definitely understood that I do not wish to limit the application of the invention thereto except as may be required by the scope of the subjoined claims.

Having described the invention, what is claimed as new is:

1. A device of the character described comprising a base having longitudinally spaced heads, a pair of longitudinally spaced carriages supporting said heads for adjustment toward and away from each other, axially aligned mandrels on the carriages, means for together rotating the mandrels, said mandrels having receptors on their inner ends between the carriages for receiving and supporting the opposite ends of the glass tube of a gas filled electric lamp, a transparent chamber extending between said heads to spacedly surround said lamp tube, the opposite ends of said chamber being in sealed abutment with portions of said heads, scoring means in said chamber supported on one of the heads and adapted to be applied to the lamp tube while said lamp tube is rotated to produce an exterior score on the tube, severing means within said chamber and supported on one of the heads, said severing means comprising a heated ring adapted to be contracted in registry with the score to melt the score and sever the lamp tube into sections.

2. A device according to claim 1 wherein exhausting means in communication with said chamber is provided to draw off and conserve the gas released from said lamp tube upon its severance into sections, said sections being removable from said receptors for servicing of the interiors thereof.

3. A device according to claim 1 wherein pressure means has communication with said chamber to introduce gas at required pressure for the reconditioned lamp tube, a melting ring is provided for registry with the abutted sections to melt the meeting edges to fuse and join the same to enclose a portion of the gas in the chamber, and heating means for heating said melting ring.

4. A device according to claim 1 wherein pressure means has communication with said chamber to introduce gas at required pressure for the reconditioned lamp tube, a melting ring is provided for registry with the abutted sections to melt the meeting edges to fuse and join the same to enclose a portion of the gas in the chamber, and heating means for heating said melting ring, said heating means comprising electrically energized resistor.

5. A device according to claim 1 wherein pressure means has communication with said chamber to introduce gas at required pressure for the reconditioned lamp tube, a melting ring is provided for registry with the abutted sections to melt the meeting edges to fuse and join the same to enclose a portion of the gas in the chamber, and energizing means for heating said melting ring, said energizing means comprising an electronic bombarding element.

6. A device according to claim 1 wherein a smoothing ring in said chamber is supported from one of said heads for bridging the junction of the abutted sections to prevent expansion of the softened portions of the sections beyond the diameter of the lamp tube and to smooth the junction.

7. The method of reconditioning a gas filled lamp which comprises severing the glass tube of the lamp into sections while removing and conserving the gas contents of the tube, servicing the interiors of the sections, then supporting the sections in axial alignment with the severed edges in abutting relation in an atmosphere of gas at the pressure required in the reconditioned tube, then melting the abutted edges to fuse the same together, then reducing the atmospheric pressure outside the joined sections while confining the junction against expansion due to outward pressure of the gas in the tube and smoothing the junction before it cools and hardens.

8. The method of reconditioning a gas filled lamp which comprises severing the glass tube of the lamp into sections while removing and conserving the gas contents of the tube, servicing the interiors of the sections, then supporting the sections in axial alignment with the severed edges in abutting relation in an atmosphere of gas, melting the abutted edges to fuse the same together, establishing the desired gas pressure just before fusing the edges together, then after the edges are fused together, reducing the atmospheric pressure outside the joined sections while confining the junction against expansion due to outward pressure of the gas in the tube and smoothing the junction before it cools and hardens, said severing being accomplished by first scoring the exterior of the tube then applying to the score a circle of small cross section body at a sufficiently high temperature to quickly melt through the walls of the tube.

9. The method of reconditioning a gas filled lamp which comprises severing the glass tube of the lamp into sections while removing and conserving the gas contents of the tube, servicing the interiors of the sections, then supporting the sections in axial alignment with the severed edges in abutting relation, melting the abutted edges to fuse the same together, establishing the desired gas pressure just before fusing the edges together, then after the edges are fused together, reducing the atmospheric pressure outside the joined sections while confining the junction against expansion due to outward pressure of the gas in the tube and smoothing the junction before it cools and hardens, said melting being performed by surrounding the abutted edges with a body at the required temperature and applying only a narrow edge of the body in close proximity to the edges so as to fuse the edges without melting adjacent portions of the sections.

10. A device according to claim 1 wherein gas exhausting and conserving means is provided in communication with said chamber to receive the gas released into said chamber from said tube upon its severance into sections.

11. A device according to claim 1 wherein said chamber is separable from said heads to expose the severed sections, said sections being individually separable from the receptors for servicing.

12. A device according to claim 1 wherein pressure means has communication with the interior of said chamber to introduce gas at the required pressure for the lamp tube prior to rejoining of the severed sections of the tube.

13. A device according to claim 1 wherein a melting ring is supported from one of said heads to surround the tube and be registered with the meeting edges of sections repaired for reassembly and in the operation of rejoining the sections, said melting ring when heated operating to fuse the abutted edges to cause their union, and heating means for heating the melting ring.

14. A device according to claim 1 wherein a melting ring is supported from one of said heads to surround the tube and be registered with the meeting edges of sections repaired for reassembly and in the operation of rejoining the sections, said melting ring when heated operating to fuse the abutted edges to cause their union, and heating means for heating the melting ring, said heating means comprising an electrical resistor.

15. A device according to claim 1 wherein a melting ring is supported from one of said heads to surround the tube and be registered with the meeting edges of sections repaired for reassembly and in the operation of rejoining the sections, said melting ring when heated operating to fuse the abutted edges to cause their union, and heating means for heating the melting ring, said heating means comprising an electronic bombarding element.

16. A device according to claim 1 wherein a melting ring is supported from one of said heads to surround the tube and be registered with the meeting edges of sections repaired for reassembly and in the operation of rejoining the sections, said melting ring when heated operating to fuse the abutted edges to cause their union, and heating means for heating the melting ring, said melting ring being of relatively large cross section having its radially inward side oppositely bevelled on its end portions to define a relatively thin edge for registry with the meeting edges of the sections being united.

17. A device of the character described comprising a base having longitudinally spaced heads, a pair of longitudinally spaced carriages supporting said heads for adjustment toward and away from each other, axially aligned mandrels on the carriages, means for together rotating the mandrels, said mandrels having receptors on their inner ends between the carriages for receiving and supporting the opposite ends of the glass tube of a gas filled electric lamp, a transparent chamber extending between said heads to spacedly surround said lamp tube, the opposite ends of said chamber being in sealed abutment with portions of said heads, scoring means in said chamber supported on one of the heads and adapted to be applied to the lamp tube while said lamp globe is rotated to produce an exterior score on the tube, severing means within said chamber and supported on one of the heads, said severing means comprising a heated ring adapted to be contracted in registry with the score to melt the score and sever the lamp tube into sections, said scoring means and said severing means being stationarily mounted to preclude rotation thereof along with the mandrels and the lamp tube.

LOUIS C. STRINGER.